United States Patent [19]
Holtmyer et al.

[11] 4,033,415
[45] July 5, 1977

[54] METHODS FOR FRACTURING WELL FORMATIONS

[75] Inventors: Marlin D. Holtmyer; Charles J. Githens; John M. Tinsley, all of Duncan, Okla.

[73] Assignee: Halliburton Company, Duncan, Okla.

[22] Filed: Oct. 14, 1976

[21] Appl. No.: 732,247

Related U.S. Application Data

[60] Division of Ser. No. 346,546, March 30, 1973, which is a continuation-in-part of Ser. No. 98,157, Dec. 14, 1970, abandoned, which is a continuation-in-part of Ser. No. 881,314, Dec. 1, 1969, abandoned.

[52] U.S. Cl. .......................... 166/308; 252/8.55 R
[51] Int. Cl.² ..................................... E21B 43/26
[58] Field of Search .......... 166/283, 281, 308, 294; 252/8.55 R, 316; 149/44

[56] References Cited

UNITED STATES PATENTS

| | | | |
|---|---|---|---|
| 3,445,305 | 5/1969 | Lyerly | 149/39 |
| 3,485,686 | 12/1969 | Jessop et al. | 149/44 X |
| 3,523,048 | 9/1970 | Hopler, Jr. | 149/44 X |
| 3,617,406 | 11/1971 | Young | 149/44 X |
| 3,727,687 | 4/1973 | Clampitt et al. | 166/294 X |
| 3,727,688 | 4/1973 | Clampitt | 166/283 |
| 3,740,360 | 6/1973 | Nimerick | 166/295 X |
| 3,757,863 | 9/1973 | Clampitt et al. | 166/270 X |
| 3,762,476 | 10/1973 | Gall | 166/270 X |
| 3,800,872 | 4/1974 | Friedman | 166/270 |
| 3,926,258 | 12/1975 | Hessert et al. | 166/295 X |

*Primary Examiner*—Stephen J. Novosad
*Attorney, Agent, or Firm*—Thomas R. Weaver; John H. Tregoning

[57] ABSTRACT

The present invention relates to a crosslinked aqueous gel for fracturing and placing propping agents within subterranean formations, said gel having a viscosity in said formations greater than about 20,000 centipoises and having pumping characteristics in turbulent flow approaching those of water.

30 Claims, No Drawings

METHODS FOR FRACTURING WELL FORMATIONS

This is a division of application Ser. No. 346,546, filed Mar. 30, 1973, which is a continuation-in-part of application Ser. No. 98,157, filed Dec. 14, 1970 (now abandoned), which is a continuation-in-part of application Ser. No. 881,314, filed Dec. 1, 1969 (now abandoned).

The present invention relates generally to methods and compositions for fracturing well formations, and more particularly, but not by way of limitation, to methods and compositions for fracturing well formations penetrated by a well bore wherein a fracturing fluid composition, with or without propping agent suspended therein, is injected into the formations through the tubing or casing at a rate sufficient to open a fracture in the formation.

Hydraulic fracturing is widely used to stimulate production from oil and gas wells completed in low permeability formations, and many methods and compositions for hydraulically fracturing subterranean well formations penetrated by a well bore have been developed.

Commonly, a fracturing fluid is pumped through the tubing or casing disposed in the well bore into the formation sought to be fractured. The fracturing fluid is pumped at a rate sufficient to open a fracture in the exposed formation, and extend the fracture from the well bore into the formation. Continued pumping of said fracturing fluid containing a propping agent into said fracture results in proppant placement within the fractured zone. Following the treatment, the fracturing fluid is recovered from the well, leaving the proppant remaining in the fracture, thereby preventing the complete closure thereof and forming a permeable channel extending from the well bore into the formation.

The conductivity of the propped fracture depends, among other things, on the size of the propping agent particles placed in the fracture. This, in turn, depends upon the width to which the particular fracture may be opened during injection of the fracturing fluid, and this normally requires that such fluids have very high viscosities. The use of fracturing fluids having relatively high viscosities is advantageous since such fluids can support the propping agent particles suspended therein without excessive settling. Also, relatively large size propping agent particles can be placed in the formation using high viscosity fracturing fluids since wider fractures generally result, reducing the possibility of the propping agent bridging across the mouth of the fracture and accumulating in the well bore, a condition commonly referred to as "screen-out."

However, the use of such high viscosity fracturing fluids is hampered due to excessive friction losses usually encountered during the injection of such fluids into a formation through tubing or casing disposed in the well bore. Since pumping equipment and tubular goods available at the wellhead are often limited, the wellhead pressure and hydraulic horsepower required to overcome such friction losses are often prohibitive. That is, a high viscosity fracturing fluid often cannot be injected into a formation at a high enough rate to effectively open a fracture and place propping agents therein due to excessive friction losses in the well tubular goods. Such friction losses would require more pump capacity and stronger tubular goods that normally are available at a well site.

Attempts have been made to overcome the high friction loss during pumping, which has heretofore been inherent in the use of high viscosity fracturing fluids, by such means as lubricating the fracturing fluid down the well bore on a layer of less viscous liquid which is injected into the well tubing along with the fracturing fluid. The lubricating liquid must be injected between the fracturing fluid and the inner walls of the well tubing, requiring highly sophisticated injection equipment and most usually requiring a lubricant. The fracturing fluid of this method is generally a high viscosity oil, which limits the usefulness of such a fracturing method to oil producing wells.

The present invention overcomes these and other difficulties by providing a crosslinked fracturing gel, which comprises an aqueous liquid, a gelling agent and a crosslinking compound, the crosslinked fracturing gel having a viscosity in subterranean formations of greater than about 20,000 centipoises and, while in turbulent flow, having a resistance to flow of less than that of water. Said gel can carry great quantities of propping agent into a formation sought to be fractured and can be pumped into the formation with pumping equipment and tubular goods normally available at a wellhead. The need for a lubricating layer between the fracturing liquid and the well tubing is eliminated.

An aqueous liquid is used to hydrate the gelling agent prior to crosslinking. The aqueous liquid must be of a pH which is compatible with the crosslinking compound used to crosslink the hydrated gelling agent and should be relatively free from impurities of a size sufficient to foul either the oil well tubing or conduit or the pumping equipment used to force the complexed fracturing gel into the formation.

The gelling agents useful in the present invention may be hydratable polysaccharides having a molecular weight of greater than about 100,000. It is believed that most hydratable polysaccharides have molecular weights of less than about 3,000,000. Suitable hydratable polysaccharides are the galactomannan gums, glucomannan gums, and cellulose derivatives. Hydratable galactomannan gums and glucomannan gums are naturally occuring, while cellulose is rendered hydratable by reacting cellulose with hydrophillic constituents. Hydratable polysaccharides having a molecular weight of less than about 100,000 do not form crosslinked fracturing gels having the required consistency and viscosity characteristics described above. The most preferred molecular weight for the hydratable polysaccharide gelling agent is from about 200,00 to about 300,00. For example, guar gum, locust bean gum, karaya gum, carboxymethylcellulose, carboxymethylhydroxyethylcellulose, and hydroxyethylcellulose are useful gelling agents. The hydroxyethlcellulose derivatives used as gelling agents should be those having between 0.5 and about 10 moles of ethylene oxide per anhydroglucose unit.

The preferred gelling agents are guar gum, carboxymethylcellulose and hydroxyethlcellulose.

The most preferred gelling agent for use in the present invention is guar gum.

The gelling agent of the present invention should be present in the aqueous liquid in a concentration of from about 0.3% to about 3% by weight of aqueous liquid. Gelling agent concentrations of less than about 0.3% by weight of the aqueous liquid provide insufficient amounts of gelling agent to provide the crosslinked fracturing gel having the required characteristics described above. Gelling agent concentrations above about 3% by weight of aqueous liquid result in an aqueous liquidgelling agent ratio which is generally insufficient to fully hydrate the gelling agent prior to crosslinking; however, the maximum useful concentration depends on the gelling characteristics of the gelling agent.

The crosslinking compounds of the present invention may be any compound which will provide the following metal ions in the oxidation state indicated: Lead (II), arsenic (III), tin (II), antimony (III), antimony (V), titanium (IV), manganese (VII), chromium (VI), tantalum (V) and niobium (V). The crosslinking compound, therefore, is comprised of one of the metals listed above and a second element or compound. The second element or compound may be any which will release the metal ions in solution.

The preferred crosslinking compounds are compounds which will provide the following metal ions in the oxidation state indicated: Antimony (V) and manganese (VII) and combinations comprising chromate or dichromate ions and reducing agents selected from the group consisting of water soluble compounds containing sulfur having an oxidation state of less than +6 and compounds which will supply the following metal ions in the oxidation state indicated: Arsenic (III), tin (II), and antimony (III).

The most preferred crosslinking compounds are compounds which will supply antimony (V) ions and combinations which will supply dichromate ions and sulfite ions. Potassium pyroantimonate and a composition comprising potassium dichromate and sodium sulfite are examples of the most preferred crosslinking compounds.

For example, compounds which may be used to supply the lead ions for crosslinking are $Pb(NO_3)_2$, $PbCl_2$, $PbSO_4$ and $PbCrO_4$.

Arsenic (III) ions may be derived from $As_2O_3$, $AsCl_3$ and $AsOCl$.

Compounds supplying antimony (III) ions are $Sb_2O_3$, potassium antimony tartrate, fused potassium antimony tartrate, antimony oxalate, antimony tartrate, and antimony ammounium fluoride.

Antimony (V) ions may be derived from $SbCl_5$ and potassium pyroantimonate.

Tin (II) compounds are derived from $SnCl_2$ and $SnSO_4$.

Titanium (IV) ions may be found in $TiCl_4$.

Manganese (VII) ions may be derived from $NaMnO_4$ and $KMnO_4$.

Chromium (VI) ions are supplied by $Na_2Cr_2O_7$, $K_2Cr_2O_7$, $Na_2CrO_4$ and $K_2CrO_4$. These are also examples of compounds which supply chromate and dichromate ions.

Tantalum (V) ions may be supplied as tantalum pentachloride.

Niobium pentachloride may be used to supply the niobium (V) ions.

Examples of water soluble compounds containing sulfur having an oxidation state of less than +6 are alkali metal sulfites including sodium sulfite, sodium bisulfite, potassium sulfite and potassium bisulfite; ammonium sulfite; ammonium bisulfite; sulfurous acid; alkali metal dithionates including sodium and potassium dithionate; ammonium dithionate; alkali metal thiosulfates including sodium thiosulfate and potassium thiosulfate; and ammonium thiosulfate.

Various hydratable polysaccharides have found to be crosslinked by metal ions in a variety of hydrogen ion concentrations. For example, hydratable natural gums have been found to be complexed by lead (II) ions supplied by lead chromate or lead dichromate at a pH of greater than about pH 8. Antimony (III) ions supplied by antimony oxide required a pH greater than about pH 7 to complex hydratable natural gums, while antimony (III) ions supplied by fused potassium antimony tartrate have been found to adjust the pH of any hydrated natural gum to above about pH 7 during the crosslinking reaction.

Potassium antimony tartrate used with potassium dichromate was found to crosslink hydrated natural gums at a pH of between about pH 2.5 and pH 7. Potassium antimony tartrate is a compound which supplies antimony (III) ions. It has been found that a similar pH is required when crosslinking hydratable natural gums with compounds providing arsenic (III) ions such as arsenous oxide, arsenous chloride and arsenous oxychloride; and tin (II) ions such as tin chloride and tin sulfate used with potassium chromate or dichromate. Dichromate or chromate ions in combination with arsenic (III), tin (II) and antimony (III) ions as reducing agents crosslink hydrated polysaccharides to form aqueous gels which reheal after being sheared.

Combinations comprising water soluble compounds containing sulfur having an oxidation state of less than +6 and chromate or dichromate ions also crosslink hydrated polysaccharides at a pH within the range of about pH 2.5 to pH 7 to form aqueous gels which reheal after being sheared.

Compounds providing antimony (V) ions were found to successfully crosslink hydratable natural gums at a pH of about 5 or below. Manganese (VII) ions, however, supplied in potassium permangeanate or sodium permanganate were found to require a pH greater than about pH 5 before they would crosslink hydratable natural gum. Antimony (V) ions and manganese (VII) ions crosslink hydrated polysacchrides to form aqueous gels which reheal after being sheared.

Titanium (IV) ions supplied by titanium tetrachloride were found to complex hydratable natural gums at a pH of less than about pH 2.

Lead (II) ions have been found to provide useful crosslinked fracturing gels when used to crosslink hydroxyethylcellulose at a pH of above about pH 10. Hydroxyethylcellulose has also been successfully crosslinked to form a fracturing gel useful in the present invention with tantalum (V) ions provided by tantalum pentachloride in pH environments of less than about pH 2. Hydrated hydroxyethylcellulose will also provide a useful fracturing gel when crosslinked with niobium (V) ions provided by niobium pentachloride in a pH environment similar to that useful for tantalum (V) ions.

It has been found that tantalum (V) ions and niobium (V) ions will form crosslinked gel with hydratable natural gumsat a pH of less than about pH 2. However, such gels have been found to be not useful in the present invention because they do not regain their original viscosity after once being subjected to shear.

Titanium tetrachloride will not cause crosslinking of a gelling agent at a pH of more than 2; however, when added to a medium containing an aqueous liquid and a gelling agent, the titanium tetrachloride reacts to form the intermediate hydroxide and hydrochloric acid in sufficient quantity to adjust the pH of the medium to less than 2, where crosslinking will occur.

Although gels made in any pH range with any of the above listed crosslinkers may be used for fracturing subterranean formations, it is the preference of the oil industry to use either neutral or acidic fracturing fluid for fear a basic fracturing fluid might cause swelling and migration of clays in the formation, an undesirable phenomenon. Therefore, the most useful crosslinkers for forming the fracturing gels of the present invention are those which operate in a pH range of 7 or below.

The amount of crosslinking agent necessary to form a crosslinked fracturing gel useful in the present invention varies from about 0.001% to about 0.5% by weight of the aqueous liquid. The preferred concentration of crosslinking agent ranges from about 0.01% to about 0.25% by weight of the aqueous liquid. It has been found that concentrations of crosslinking agent of less than about 0.001% do not provide sufficient ions to fully crosslink the hydrated polysaccharide. Crosslinking agent concentrations greater than about 0.5% by weight of the aqueous liquid have been found to form crosslinks which provide a cohesiveness and viscosity in the fracturing gel which is not useful. Excessive amounts of the crosslinking agent have been found to cause such tight crosslinks that syneresis often occurs.

Any of a variety of conventional propping agents may be employed with the fracturing fluid compositions of the present invention such as quartz sand grains, tempered glass beads, rounded walnut shell fragments, aluminum pellets, nylon pellets and similar materials. Such agents are generally used in concentrations between about 1 to about 8 pounds per gallon of the fracturing fluid composition, but higher or lower concentrations may be used as required. The size of propping agent employed depends on the particular type of formation to be fractured, pressure and pumping rates available and other factors. However, particles up to about 2 mesh on the U.S. Sieve Series scale may generally be employed in fracturing well formations with the compositions of the present invention without screenout occurring.

The crosslinked fracturing gel of the present invention is used by pumping it into a well bore traversing the subterranean formation sought to be fractured. Said gel is pumped at a rate sufficient to fracture the formation and to place propping agents in the fracture.

The composition may be prepared for use by mixing a predetermined quantity of the hydratable polysaccharide gelling agent with a quantity of water to form a hydrated gel. Any suitable conventional batch mixing apparatus may be employed for this purpose. After the gelling agent and the water have been mixed for a time sufficient to form a hydrated gel, a quantity of crosslinking agent is mixed with the hydrated gel, and the mixture is pumped into the well bore as the crosslinking reaction takes place. Propping agents are generally added to the hydrated gel prior to the addition of the crosslinking agent and as the hydrated gel is pumped to the well bore.

The rate at which the crosslinking reaction takes place at normal temperature (about 60° F to about 120° F) is dependent upon the pH of the hydrated fracturing gel. For example, at a pH of below about 1.5 potassium pyroantimonate will not crosslink hydrated guar gum; and at a pH of above about pH 5.5, the crosslinking reaction is slow (greater than two hours at room temperatures). The maximum crosslinking reaction rate of this particular crosslinking system takes place at about pH 3. Therefore, in order to insure that the crosslinking reaction takes place in the desired period of time, the pH of the aqueous liquid or aqueous liquid-gum mixture may be adjusted to a desired level within the range of from about pH 1.5 to about pH 5.5 by the addition of a pH adjusting chemical. Since water from most sources is substantially neutral, the chemical or chemicals used for this purpose may be suitable acids, acid buffers, mixtures thereof, or mixtures of acids and bases. Examples of suitable acids are hydrochloric acid, fumaric acid, and phthalic acid. Examples of suitable buffers are potassium biphthalate, sodium hydrogen fumarate, and sodium dihydrogen citrate. Examples of mixtures of acids and bases are fumaric acid and sodium fumarate, adipic acid and disodium phosphate, and fumaric acid and sodium carbonate.

Lumping sometimes occurs when the gelling agent is hydrated. This is believed to be caused by too rapid hydration of the gelling agent. It has been found that lumping of the gelling agent during hydration can be reduced or eliminated by raising the pH of the aqueous liquid during hydration. For example, when hydrating guar gum the hydration may be slowed by adding a base such as sodium silicate to the aqueous liquid used to hydrate the gelling agent in an amount sufficient to raise the pH of the hydrated gel to about pH 10. The hydration is thus slowed so that lumping of the gelling agent is avoided.

Once the crosslinked fracturing gel has been pumped into the subterranean formation and a fracture has been formed, it its desirable to "break" the gel into a fluid having low viscosity so that it can be either pumped or produced from the formation through the well bore. There are various means available for breaking the fracturing gel of the present invention. Most of the fracturing gels of the present invention will break into a low viscosity fluid with time and temperature. However, it is usually more desirable to have a predictable breaking time within relatively narrow limits. Therefore, breakers may be included in the fracturing gel of the present invention as an optional element. Mild oxidizing agents are useful as breakers when a crosslinked fracturing gel is used in a relatively high temperature formation, although formation temperatures of 160° F or greater will generally break said fracturing gel relatively quickly without the aid of an oxidizing agent. Suitable oxidizing agents are ammonium persulfate, potassium dichromate and potassium permanganate. For fracturing gels used at temperatures below about 140° F, enzymes are generally used as breakers. Suitable enzymes for such use are alpha and beta amylases, amyloglucosidase, oligoglucosidase, invertase, maltase, cellulase and hemicullulase.

A fracturing gel formed with potassium permanganate will require no breaker, although a breaker may be used with said potassium permanganate fracturing gel as an optional feature. It has been discovered that potassium permanganate will crosslink a gelling agent to form a fracturing gel and then oxidize said fracturing gel into a low viscosity fluid within a predictable time.

When a crosslinked fracturing gel is used for fracturing a subterranean formation, it is important that the crosslinking occurs while the gel is moving down the well bore toward the formation. If the crosslinking occurs either in the pumps or prior to entering the pumps, some pumping difficulty might be encountered.

If the crosslinking does not occur before the gel reaches the formation, the gel will not have the viscosity required to place large quantities of sand in the formation, thus causing a possible sanding-out of the well.

It is important that the crosslinked fracturing gel of the present invention have a cohesiveness which will allow it to maintain the properties of a semisolid substance for long periods of time. This assures that it will remain in place in the formation and that is will support large propping agents for great lengths of time.

The gel of the present invention has a cohesiveness which will enable a mass of it to stand on a chicken wire screen at room temperature for about 5 minutes without showing a tendency to pass through the screen. The chicken wire used is a crisscross of regular hexagons, each hexagon having a length of about 1.4 inches and a width of about 1 inch. A mass of the inventive gel placed on a screen of such a chicken wire sample will show no tendency to pass through the screen for at least about 5 minutes.

The cohesiveness of the crosslinked fracturing gel is further demonstrated in that a mass of the inventive gel placed on a table top has been found to support the weight of a 450-gram steel ball having a diameter of about 1.8 inches so that said ball will not touch the table. Such a ball placed on a mass of the inventive gel will remain completely suspended on the top of said mass for at least about 15 minutes. It has also been observed that the inventive gel, when prepared in a 500 ml graduated cylinder, will form a ropelike mass which, if removed from the cylinder and held by one end, will remain suspended without breaking for about 5 minutes.

A further characteristic of the inventive gel is observed when it is formed in a metal pipe placed in a vertical position and having its bottom end closed with a rubber stopper. The gel is left in the pipe for about 5 minutes before the rubber stopper is removed, whereupon the gel flows readily from the pipe, lubricated by a film or ring of less viscous liquid formed between the pipe and the gel. It is observed that the inventive gel forms a lubricating film of fluid having a viscosity of less than that of the gel whenever it is placed in contact with a metal surface for about 5 minutes. The film forms at the point of contact between the gel and the metal surface.

The crosslinked fracturing gel of the present invention has been found to have a viscosity of about 20,000 centipoises in an earth formation, although it can be pumped through well bore tubing and casing with a pressure resistance approaching that of water. It has been found that during its flow through the oil well tubing the inventive gel is subjected to turbulent shear and its viscosity is reduced. However, when the rate of flow is reduced as the crosslinked fracturing gel enters the formation, said gel regains the high viscosity which enables it to fracture the formation and to carry a propping agent into the formation. Although not all embodiments of the inventive gel exhibit the ability to regain their viscosity after the viscosity has been reduced by turbulent shearing, the most preferred embodiments of said gel do exhibit this quality.

The most preferred embodiments are hydrated polysaccharides crosslinked with the preferred crosslinking compounds.

The following are examples of the crosslinked fracturing gel of the present invention and are intended only to further describe certain aspects of said gel. The examples are given primarily for the purpose of illustration; and the invention, in its broader aspects, is not to be construed as limited thereto.

EXAMPLE I

Test Procedure

Each of the samples, A-L, described in Table I, below, is prepared by first hydrating about 4.8 grams of guar gum in about 500 mls of tap water. After each sample is allowed to hydrate at room temperature for about ½hour, its pH is adjusted to accommodate the crosslinker intended for use with that sample. Each sample is the crosslinked with one of the crosslinkers under investigation, and the properties of the crosslinked fracturing gels thus formed are studied.

Table I, below, shows that at various pH's, the metal ion crosslinkers tested form satisfactory fracturing gels except for borax used with sodium hydroxide, which will not perform satisfactorily when subjected to the ball test, and tantalum pentachloride at a pH of about pH 2 which will not pass either the chicken wire test or the ball test. It is also notable that the gel formed with the borax-sodium hydroxide crosslinking compound failed to regain sufficient viscosity after shearing to give a satisfactory viscosity reading. Table I further indicates all of the remaining crosslinked fracturing gels do provide a viscosity of greater than about 20,000 centipoises after shearing.

TABLE I

| METAL ION SOURCE | CHICKEN WIRE[1] | BALL TEST[2] | VISCOMETER READING | | HANGING TEST[5] | BOUNDARY LAYER[6] | pH[7] |
|---|---|---|---|---|---|---|---|
| | | | BEFORE SHEARING[3] | AFTER SHEARING[4] | | | |
| Potassium pyroantimonate and acid | yes | yes | pegged | 170+ | yes | 5 min. | 3.0 |
| Stannous chloride + potassium dichromate | Yes | Yes | 220+ | 200+ | yes | 5 min. | 6.6 |
| Potassium antimony tartrate + potassium dichromate | yes | yes | 270° | 40+ | yes | 5 min. | 6.9 |
| Antimony oxalate + potassium dichromate | yes | yes | pegged | 210+ | yes | 6 min. | 4.0 |
| Arsenous oxide + potassium dichromate | yes | yes | 230+ | 300+ | yes | 7 min. 10 sec. | 6.5 |
| Antimony ammonium fluoride + potassium dichromate | yes | yes | 220+ | 35+ | yes | 5 min. | 4.5 |
| Tantalum pentachloride | no | no | 200+ | 37+ | yes | 5 min. | 2.0 |
| Potassium permanganate | yes | yes | pegged | 32+ | yes | 6 min. 50 sec. | 7.6 |
| Titanium tetrachloride | yes | yes | pegged | 200+ | yes | 5 min. | 1.3 |
| Fused potassium antimony tartrate[8] | yes | yes | 220+ | pegged | yes | 25 min. | 8.4 |
| Lead sulfate + potassium dichromate + | yes | yes | 230+ | 40+ | yes | 5 min. | 10.1 |

TABLE I-continued

| METAL ION SOURCE | CHICKEN WIRE[1] | BALL TEST[2] | VISCOMETER READING BEFORE SHEARING[3] | VISCOMETER READING AFTER SHEARING[4] | HANGING TEST[5] | BOUNDARY LAYER[6] | pH[7] |
|---|---|---|---|---|---|---|---|
| sodium hydroxide | | | | | | | |
| Borax + sodium hydroxide | yes | no | pegged | 0[9] | yes | no | 11.5 |

NOTE:
[1] The crosslinked gels are allowed to stand on chicken wire for 5 minutes. If they showed no tendency to pass through the screen, the gels are considered useful as crosslinked facturing gels.
[2] This experiment demonstrates the suspending properties of crosslinked facturing gels. A 450-gram steel ball is placed on a sample of said gel. If the gel supports the ball, it passes the test.
[3] Viscosity of the crosslinked fracturing gels is measured with a model 35 Fann Viscometer (No. 4 spring, No. 2 sleeve) at 100 RPM. Viscometer readings are shown. Reading above about 30 indicates viscosity greater than about 20,000 centipoises.
[4] 8c Viscosities of the gels are measured with a Model 35 Fann Viscometer (No. 4 spring, No. 2 sleeve) at 100 RPM after the gels were sheared by ten passes through a gear pump. Viscometer readings are shown. Reading above about 30 indicates viscosity greater than about centipoises. Each gel exhibited a resistance to flow of less than that of water during the shearing process.
[5] The crosslinked fracturing gels formed in a 500 ml graduated cylinder are required to hang freely for 5 minutes without breaking off.
[6] Metal tube is completely dried before addition of crosslinked gel and the crosslinked gel is maintained completey motionless for the first 5 minutes. Time required for gel to slide from the tube on the boundary layer formed between the tube and the gel is observed. [7] pH of the gels.
[8] Commercially available potassium antimony tartrate is fused at 200° C for one hour.
[9] The sheared gel breaks into small chunks and does not regain its viscosity.

EXAMPLE II

Test Procedure

Samples, A through G, of fracturing gels are prepared in accordance with the procedure outlined in Example I except using hydroxyethylcellulose as the gelling agent. The samples are submitted to the same tests described in Example I with the results shown in Table II, below. These tests indicate hydroxyethylcellulose may be a useful gelling agent in the present invention.

TABLE II

| CROSSLINKER | CHICKEN WIRE[1] | BALL TEST[2] | VISCOMETER READING BEFORE SHEARING[3] | VISCOMETER READING AFTER SHEARING[4] | HANGING TEST[5] | BOUNDARY LAYER[6] | pH[7] |
|---|---|---|---|---|---|---|---|
| Lead chromate | yes | yes | pegged | 40+ | yes | yes | basic |
| Lead chloride | yes | yes | pegged | 40+ | yes | yes | basic |
| Lead chloride + sodium dichromate | yes | yes | pegged | 40+ | yes | yes | basic |
| Tantalum pentachloride | yes | yes | pegged | 35+ | yes | yes | acid |
| Zirconyl chloride | yes | yes | pegged | 50+ | yes | yes | basic |
| Chromium chloride | yes | yes | pegged | 40+ | yes | yes | basic |
| Niobium pentachloride | yes | yes | pegged | 35+ | yes | yes | acid |
| Chromium sulfate | yes | yes | pegged | 50+ | yes | yes | basic |

NOTE:
[1] The crosslinked gels are allowed to stand on chicken wire for 5 minutes. If they showed no tendency to pass through the screen, the gels are considered useful as crosslinked fracturing gels.
[2] This experiment demonstrates the suspending properties of crosslinked fracturing gels. A 450-gram steel ball is placed on a sample of said gel. If the gel supports the ball, it passes the test.
[3] Viscosity of the crosslinked fracturing gels is measured with a Model 35 Fann Viscometer (No. 4 spring, No. 2 sleeve) at 100 RPM. Viscometer readings are shown. Reading above about 30 indicates viscosity greater than about 20,000 centipoises.
[4] Viscosities of the gels are measured with a Model 35 Fann Viscometer (No. 4 spring, No. 2 sleeve) at 100 RPM after the gels were sheared by ten passes through a gear pump. Viscometer readings are shown. Reading above about 30 indicates viscosity greater than about 20,000 centipoises. Each gel exhibited a resistance to flow of less than that of water during the shearing process.
[5] The crosslinked fracturing gels formed in a 500 ml graduated cylinder are required to hang freely for 5 minutes without breaking off.
[6] Metal tube is completely dried before addition of crosslinked gel and the crosslinked gel is maintained completely motionless for the first 5 minutes. Time required for gel to slide from the tube on the boundary layer formed between the tube and the gel is observed.
[7] pH of the gels.
[8] Commercially available potassium antimony tartrate is fused at 200° C for one hour.
[9] The sheared gel breaks into small chunks and does not retain its viscosity.

EXAMPLE III

Test Procedure

Eight crosslinked fracturing gels are prepared using the crosslinking compounds described in Table III, below, with guar gum. The gelling agent is hydrated and circulated at a flow rate of about 19 ft./sec. through a constant temperature (80° F) piping circuit having a test section 5 ft. in length and an internal diameter of 0.493 inches designed to duplicate the shear effect produced by pumping the gel through oil well tubing. The crosslinker is added, and the flow rate is reduced to about 14 ft./sec. and maintained for about 3.5 minutes to shear the gel. The flow rate is then dropped to about 4.5 ft./sec. and the resistance to shear of the gel is observed to determine whether said resistance increases after being sheared. The flow rate is then returned to about 19 ft./sec. where it is maintained for about 4.5 minutes, after which it is again reduced to about 4.5 ft./sec. The gel is once again observed to determine whether the twice-sheared gel will regain its resistance to flow.

The test results in Table III, below, indicate some of the complexed fracturing gels are capable of regaining their resistance to flow after being sheared and then allowed to "rest." Gels which will regain their resistance to flow after shearing are preferred crosslinked fracturing gels because they insure the fracturing gel will have a high viscosity in the fracture after it has been sheared during pumping to the fracture.

The preferred crosslinked fracturing gels illustrate the properties of hydrated polysaccharides crosslinked with the preferred crosslinking agents.

TABLE III

Temperature - 80° F
Gelling Agent - guar gum

| Crosslinker | Δ Flow Reistance After Shearing (Measured at 4.5 ft./sec. Flow Rate) | | | |
|---|---|---|---|---|
| | After 1st Shearing | | After 2nd Shearing | |
| | Time Observed | ΔPSI | Time Observed | ΔPSI |
| Tin chloride + potassium dichromate | 2.5 min. | +2.5 | 10.0 min. | +1.3 |
| As$_2$O$_3$ + potassium dichromate + NaHCO$_3$ | 3.0 min. | +1.0 | 10.0 min. | +3.0 |
| Antimony oxalate + K$_2$Cr$_2$O$_7$ | 3.0 min. | +0.5 | 4.0 min. | +0.5 |
| Potassium permanganate | 3.0 min. | +2.0 | 8.0 min. | +1.0 |
| Antimony ammonium fluoride + potassium dichromate | 3.5 min. | −20.0 | 8.5 min. | +1.0 |
| Sodium sulfite + potassium dichromate | 3.0 min. | +2.5 | 8.5 min. | +1.3 |
| Borate + lime[1] | 4.5 min. | −2.0 | — | — |
| Potassium pyroantimonate | 3.0 min. | +2.5 | 8.5 min. | +3.0 |

NOTE:
[1]Resistance to flow after shearing is below resistance to flow demonstrated by uncrosslinked hydrated guar gum at the same pump speed.

EXAMPLE IV

Test Procedure

Four samples, A through D, of the crosslinked fracturing gel are prepared as follows:

Sample A: Hydrated guar gum persent in a concentration of about 80 pounds per 1,000 gallons of water is crosslinked with potassium pyroantimonate present in a concentration of about 5 pounds per 1,000 gallons of water.

Sample B: Hydrated guar gum present in a concentration of about 80 pounds per 1,000 gallons is crosslinked with sodium dichromate, present in a concentration of about 7 pounds per 1,000 gallons, and sodium sulfite, present in a concentration of about 15 pounds per 1,000 gallons of water.

Sample C: Hydrated guar gum present in a concentration of about 80 pounds per 1,000 gallons is crosslinked with potassium antimony tartrate, present in a concentration of about 8 pounds per 1,000 gallons of water, and sodium dichromate, present in a concentration of about 7 pound per 1,000 gallons of water.

Sample D: Hydrated guar gum present in a concentration of about 80 pounds per 1,000 gallons of water is crosslinked with potassium permanganate present in a concentration of about 2 pounds per 1,000 gallons of water.

Each sample is blened in tanks of the type commonly used in oil fields and is pumped through oil field pumps into a string of 3-inch diameter tubing having a length of about 5,000 feet, thus duplicating the conditions present during the fracturing of an oil well. The resistance to flow of each sample through the tubing is observed and is compared to the resistance to flow of water through the same tubing. The resistance to flow is measured in PSI.

After each sample passes through the tubing, a portion of it is placed in a Brookfield Viscometer (No. 3 spindle, 6 RPM) to determine its viscosity after about 5,000 feet of turbulent flow.

Table IV, below, indicates each of the samples, A through D, exhibited a resistance to turbulent flow of less than water. Further, Table IV shows each of the crosslinked fracturing gels pegged the Brookfield Viscometer after 5,000 feet of turbulent flow, indicating a viscosity in subterranean formations of about 20,000 centipoises.

TABLE IV

| Sample | Rate of Flow (BPM) | | Resistance to Flow (PSI) | | Viscosity After 5,000 Ft. |
|---|---|---|---|---|---|
| | Water | Gel | Water | Gel | |
| A | 8.0 | 8.0 | 3,700 | 1,500 | >20,000 cp |
| B | 8.0 | 8.0 | 3,700 | 1,250 | >20,000 cp |
| C | 8.0 | 8.0 | 3,700 | 1,500 | >20,000 cp |
| D | 5.3 | 5.3 | 1,920 | 1,000 | >20,000 cp |

We claim:

1. A method of fracturing a subterranean formation penetrated by a well bore which comprises introducing a crosslinked aqueous fracturing gel into said formation through said well bore at a rate sufficient to fracture said formation wherein said fracturing gel consists essentially of the reaction product of a hydratable polysaccharide, which has been hydrated with an aqueous liquid, and a crosslinking agent;

wherein said hydratable polysaccharide is present in the range of about 0.3% by weight of said aqueous liquid, said crosslinking agent is present in the range of about 0.001% to about 0.5% by weight of said aqueous liquid and said reaction product is produced at a pH in the range of about 1.5 to about 5.5; further wherein said hydratable polysaccharide has a molecular weight of at least about 100,000 and is selected from the group consisting of galactomannan gums, glucomannan gums and cellulose derivatives having hydrophillic constituents; and still further wherein said crosslinking agent is selected from compounds which will provide antimony (V) ions.

2. The method of claim 1 wherein said hydratable polysaccharide is present in the range of from about 0.3% to about 1% by weight of said aqueous liquid.

3. The method of claim 2 wherein said hydratable polysaccharide has a molecular weight in the range of about 100,000 to about 3,000,000 and is selected from the group consisting of guar gum, carboxymethylcellulose, hydroxyethylcellulose, locust bean gum, karaya gum, and carboxymethlhydroxyethlcellulose.

4. The method of claim 3 wherein said hydratable polysaccharide has a molecular weight in the range of about 100,000 to about 300,000 and is selected from the group consisting of guar gum, carboxymethylcellulose and hydroxyethylcellulose.

5. The method of claim 4 wherein said crosslinking agent is present in the range of about 0.01% to about 0.25% by weight of said aqueous liquid.

6. The method of claim 5 wherein said hydratable polysaccharide is guar gum and said crosslinking agent is potassium pyroantimonate.

7. The method of claim 6 wherein said pH is about 3.

8. A method of fracturing a subterranean formation penetrated by a well bore which comprises introducing a crosslinked aqueous fracturing gel into said formation through said well bore at a rate sufficient to fracture said formation wherein said fracturing gel consists essentially of the reaction product of a hydratable polysaccharide, which has been hydrated with an aqueous liquid, and a crosslinking agent selected from potassium permanganate and sodium permanganate;

wherein said hydratable polysaccharide is present in the range of about 0.3% to about 3% by weight of said aqueous liquid, said crosslinking agent is present in the range of about 0.001% to about 0.5% by weight of said aqueous liquid and said reaction product is produced at a pH in the range of greater than about 5 to about 7; further wherein said hydratable polysaccharide has a molecular weight of at least about 100,000 and is selected from the group consisting of galactomannan gums and glucomanan gums.

9. The method of claim 8 wherein said hydratable polysaccharide is present in the range of from about 0.3% to about 1% by weight of said aqueous liquid.

10. The method of claim 9 wherein said hydratable polysaccharide has a molecular weight in the range of about 100,000 to about 3,000,000 and is selected from the group consisting of guar gum, locust bean gum and karaya gum.

11. The method of claim 10 wherein said hydratable polysaccharide has a molecular weight in the range of about 100,000 to about 300,000.

12. The method of claim 11 wherein said crosslinking agent is present in the range of about 0.01% to about 0.25% by weight of said aqueous liquid.

13. The method of claim 12 wherein said hydratable polysaccharide is guar gum.

14. A method of fracturing a subterranean formation penetrated by a well bore which comprises introducing a crosslinked aqueous fracturing gel into said formation through said well bore at a rate sufficient to fracture said formation wherein said fracturing gel consists essentially of the reaction product of guar gum which has been hydrated with an aqueous liquid, and a crosslinking agent;

wherein said guar gum is present in the range of about 0.3% to about 1% by weight of said aqueous liquid, said crosslinking agent is present in the range of about 0.01% to about 0.25% by weight of said aqueous liquid and said reaction product is produced at a pH in the range of greater than about 5 to about 7; further wherein said guar gum has a molecular weight in the range of about 100,000 to about 300,000; and still further wherein said crosslinking agent is selected from the group consisting of sodium permanganate and potassium permanganate.

15. A method of fracturing a subterranean formation penetrated by a well bore which comprises introducing a crosslinked aqueous fracturing gel into said formation through said well bore at a rate sufficient to fracture said formation wherein said fracturing gel consists essentially of the reaction product of guar gum, which has been hydrated with an aqueous liquid, and a crosslinking agent;

wherein said guar gum is present in the range of about 0.3% to about 3% by weight of said aqueous liquid, said crosslinking agent is present in the range of about 0.001% to about 0.5% by weight of said aqueous liquid and said reaction product is produced at a pH in the range of about 2.5 to about 7; further wherein said guar gum has a molecular weight of at least about 100,000; and still further wherein said crosslinking agent is selected from combinations of oxidizing agents and reducing agents; said oxidizing agents being selected from the group consisting of sodium chromate, potassium chromate sodium dichromate and potassium dichromate; and said reducing agents being selected from the group consisting of sodium sulfite, potassium sulfite, ammonium sulfite, ammonium bisulfite, alkali metal dithionates, ammonium dithionate, and ammonium thiosulfate.

16. The method of claim 15 wherein said guar gum is present in the range of from about 0.3% to about 1% by weight of said aqueous liquid.

17. The method of claim 16 wherein said guar gum has a molecular weight in the range of about 100,000 to about 3,000,000.

18. The method of claim 17 wherein said guar gum has a molecular weight in the range of about 100,000 to about 300,000.

19. The method of claim 18 wherein said crosslinking agent is present in the range of about 0.01% to about 0.25% by weight of said aqueous liquid.

20. The method of claim 19 wherein said oxidizing agent is selected from sodium chromate and potassium chromate.

21. The method of claim 19 wherein said oxidizing agent is selected from sodium dichromate and potassium dichromate.

22. The method of claim 19 wherein said oxidizing agent is potassium dichromate, and said reducing agent is sodium sulfite.

23. The method of claim 19 wherein said reducing agent is selected from sodium sulfite and potassium sulfite.

24. A method of fracturing a subterranean formation penetrated by a well bore which comprises introducing a crosslinked aqueous fracturing gel into said formation through said well bore at a rate sufficient to fracture said formation wherein said fracturing gel consists essentially of the reaction product of guar gum, which has been hydrated with an aqueous liquid, and a crosslinking agent;

wherein said guar gum is present in the range of from about 0.3% to about 1% by weight of said aqueous liquid, said crosslinking agent is present in the range of about 0.01% to about 0.25% by weight of said aqueous liquid and said reaction product is produced at a pH in the range of about 2.5 to about 7; further wherein said guar gum has a molecular weight in the range of about 100,000 to about 300,000, and still further wherein said crosslinking agent is selected from combinations of oxidizing agents and reducing agents; said oxidizing agents being selected from sodium chromate and potassium chromate and said reducing agents being selected from the group consisting of sodium sulfite, potassium sulfite, ammonium sulfite, ammonium bisulfite, alkali metal dithionates, ammonium dithionate, and ammonium thiosulfate.

25. A method of fracturing a subterranean formation penetrated by a well bore which comprises introducing a crosslinked aqueous fracturing gel into said formation through said well bore at a rate sufficient to fracture said formation wherein said fracturing gel consists essentially of the reaction product of guar gum, which has been hydrated with an aqueous liquid, and a crosslinking agent;

wherein said guar gum is present in the range of about 0.3% to about 1% by weight of said aqueous liquid, said crosslinking agent is present in the range of about 0.01% to about 0.25% by weight of said aqueous liquid and said reaction product is produced at a pH in the range of about 2.5 to about 7; further wherein said guar gum has a molecular weight in the range of about 100,000 to about 300,000 and still further wherein said crosslinking agent is a combination of an oxidizing agent and a reducing agent; said oxidizing agent being potassium dichromate, and said reducing agent being sodium sulfite.

26. A method of fracturing a subterranean formation penetrated by a well bore which comprises introducing a crosslinked aqueous fracturing gel into said formation through said well bore at a rate sufficient to fracture said formation wherein said fracturing gel consists essentially of the reaction product of guar gum, which has been hydrated with an aqueous liquid and a crosslinking agent;

wherein said guar gum is present in the range of about 0.3% to about 3% by weight of said aqueous liquid, said crosslinking agent is present in the range of about 0.001% to about 0.5% by weight of said aqueous liquid and said reaction product is produced at a pH in the range of about 2.5 to about 7; further wherein said guar gum has a molecular weight of at least about 100,000; and still further wherein said crosslinking agent is selected from combinations of oxidizing agents and reducing agents; said oxidizing agents being selected from the group consisting of sodium chromate, potassium chromate, sodium dichromate and potassium dichromate; and said reducing agents being selected from the group consisting of arsenous oxide, arsenous chloride, arsenous oxychloride, potassium antimony tartrate, fused potassium antimony tartrate, antimony oxalate, antimony tartrate, antimony ammonium fluoride, tin chloride and tin sulfate.

27. The method of claim 26 wherein said guar gum is present in the range of from about 0.3% to about 1% by weight of said aqueous liquid.

28. The method of claim 27 wherein said crosslinking agent is present in the range of about 0.01% to about 0.25% by weight of said aqueous liquid.

29. The method of claim 28 wherein said oxidizing agent is selected from sodium dichromate and potassium dichromate.

30. The method of claim 28 wherein said oxidizing agent is selected from sodium chromate and potassium chromate.

* * * * *

UNITED STATES PATENT OFFICE
CERTIFICATE OF CORRECTION

Patent No. 4,033,415          Dated July 5, 1977

Inventor(s) Marlin D. Holtmyer, Charles J. Githens and John M. Tinsley

It is certified that error appears in the above-identified patent and that said Letters Patent are hereby corrected as shown below:

At Column 2, line 2, delete [that] and insert --than--.

At Column 2, line 52, delete [200,00] and insert --200,000--.

At Column 2, line 53, delete [300,00] and insert --300,000--.

At Column 4, line 3, between "have" and "found" insert --been--.

At Column 5, line 2, delete [adjuct] and insert --adjust--.

At Column 8, Table I, in the column headed "Before Shearing," delete [270°] and insert --270+--.

At Column 9, Table I (Continued), in line 1 of Footnote 4, delete [8c].

At Column 9, Table I (Continued), in line 2 of Footnote 4, after the word "about" (second occurrence), insert --20,000--.

At Column 9, Table II, Footnote 9, delete [retain] and insert --regain--.

UNITED STATES PATENT OFFICE
CERTIFICATE OF CORRECTION

Patent No. 4,033,415    Dated July 5, 1977

Inventor(s) Marlin D. Holtmyer, Charles J. Githens and John M. Tinsley

It is certified that error appears in the above-identified patent and that said Letters Patent are hereby corrected as shown below:

At Column 11, at line 53, delete [blened] and insert --blended--.

At Column 12, Claim 1, at line 25, between "0.3%" and "by" insert --to about 3%--.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*